(12) United States Patent
Uehara et al.

(10) Patent No.: US 10,011,203 B2
(45) Date of Patent: Jul. 3, 2018

(54) CABLE APPARATUS

(71) Applicant: ANSEI CORPORATION, Obu (JP)

(72) Inventors: Hiroki Uehara, Nagoya (JP); Yasunori Sahashi, Nagoya (JP); Masaharu Takagi, Nagoya (JP); Masato Fukaya, Nagoya (JP)

(73) Assignee: ANSEI CORPORATION, Obu (JP)

( * ) Notice: Subject to any disclaimer, the term of this patent is extended or adjusted under 35 U.S.C. 154(b) by 64 days.

(21) Appl. No.: 15/358,704

(22) Filed: Nov. 22, 2016

(65) Prior Publication Data

US 2017/0151899 A1 Jun. 1, 2017

(30) Foreign Application Priority Data

Nov. 30, 2015 (JP) .................................. 2015-233055

(51) Int. Cl.
*B60N 2/02* (2006.01)
*B60N 2/66* (2006.01)
*B60N 2/22* (2006.01)
*B60N 2/75* (2018.01)

(52) U.S. Cl.
CPC ............. *B60N 2/6671* (2015.04); *B60N 2/22* (2013.01); *B60N 2/79* (2018.02)

(58) Field of Classification Search
CPC ........... B60N 2/6671; B60N 2/79; B60N 2/22
See application file for complete search history.

(56) References Cited

U.S. PATENT DOCUMENTS

| | | | |
|---|---|---|---|
| 9,090,179 B2* | 7/2015 | Ishii ..................... | B60N 2/0155 |
| 2004/0127114 A1* | 7/2004 | Iwakami ............... | B63H 11/113 440/42 |
| 2011/0175420 A1* | 7/2011 | Bruck .................. | B60N 2/2245 297/364 |
| 2011/0187171 A1* | 8/2011 | Ishii ......................... | B60N 2/20 297/354.12 |
| 2011/0233981 A1* | 9/2011 | Ishii ..................... | B60N 2/2245 297/365 |
| 2013/0187425 A1* | 7/2013 | Pleskot ................... | B60N 2/12 297/353 |
| 2015/0306978 A1* | 10/2015 | Watanabe ............... | B60N 2/06 297/344.1 |

FOREIGN PATENT DOCUMENTS

JP 2006038217 A 2/2006
JP 2010274903 A * 12/2010

* cited by examiner

*Primary Examiner* — Lori Lynn Lyjak
(74) *Attorney, Agent, or Firm* — J. Tek Law PLLC; Jeffrey D. Tekanic; Scott T. Wakeman

(57) ABSTRACT

A cable apparatus is disposed between a handle and an actuator to transmit movement of the handle to the actuator. The handle includes a handle housing defining a housing chamber and an operation lever supported by the handle housing so as to be pivotable about a first axis. The cable apparatus includes a case housed in the housing chamber, a cable having a first end disposed in the case and a second end connected to the actuator, and a link lever supported by the case so as to be pivotable about a second axis. The link lever is connected to the first end of the cable in the case, and is displaceable by pivoting the operation lever.

14 Claims, 11 Drawing Sheets

CABLE APPARATUS

CROSS-REFERENCE TO RELATED APPLICATION

The present application claims priority to Japanese patent application serial number 2015-233055 filed on Nov. 30, 2015, the contents of which are incorporated fully herein by reference.

TECHNICAL FIELD

The present invention relates to a cable apparatus, which may be used in a vehicle, e.g., with a vehicle seat reclining apparatus.

BACKGROUND ART

Japanese Patent Application Laid-Open No. 2006-38217 discloses a known cable apparatus that is disposed between a handle and an actuator and transmits movement (e.g., an operation or manipulation) of the handle to the actuator. The cable apparatus is formed by connecting a first control cable and a second control cable.

The first control cable includes a first cable, a first coupling case, and first coupling piece. A first end of the first cable is connected to the handle. A second end of the first cable is connected to the first coupling piece in the first coupling case.

The second control cable includes a second cable, a second coupling case, and a second coupling piece. A first end of the second cable is connected to the second coupling piece in the second coupling case. The second coupling case is connected to the first coupling case to cover an end portion of the first coupling case. The second coupling piece is connected to the first coupling piece in the first and second coupling cases. Consequently, the second end of the first cable, the first and second coupling pieces, and the first end of the second cable are capable of integrally moving in a reciprocating manner in the first and second coupling cases. The second end of the second cable is connected to the actuator.

In such a cable apparatus, when the first end of the first cable is displaced by movement (operation) of the handle, the displacement is transmitted to the second end of the second cable via the second end of the first cable, the first and second coupling pieces, and the first end of the second cable. As a result, the movement (operation) of the handle is transmitted to the actuator.

However, the above-described known cable apparatus has a rather complicated structure in which the second end of the first cable, the first and second coupling pieces, and the first end of the second cable are connected to be capable of integrally moving in a reciprocating manner in the first and second coupling cases connected to each other. Therefore, with such a known cable apparatus, it is difficult to achieve a reduction in manufacturing costs and a simplification of the assembly work.

SUMMARY OF THE INVENTION

It is therefore an object of the present teachings to disclose a cable apparatus that can achieve a reduction in manufacturing costs and/or a simplification of the assembly work.

According to a first aspect of the present teachings, a cable apparatus is preferably disposed between a handle and an actuator and transmits movement (an operation) of the handle to the actuator. The handle includes a handle housing, in which a housing chamber is formed, and an operation lever supported by the handle housing so as to be pivotable about a first axis. The cable apparatus preferably comprises: a case housed in the housing chamber; a cable having a first end disposed in the case and a second end connected to the actuator; and a link lever supported by the case so as to be pivotable about a second axis. The link lever is connected to the first end of the cable in the case, and is displaceable by pivoting (pivotally moving) the operation lever.

Other objects, aspects, embodiments and advantages of the present teachings will become apparent to a person of ordinary skill in the art by reading the following description of the exemplary embodiments in view of the attached drawings and appended claims.

DETAILED DESCRIPTION OF EXEMPLARY EMBODIMENTS

Preferred embodiments of the present teachings will be explained in further detail below with reference to the drawings.

Figure 1:
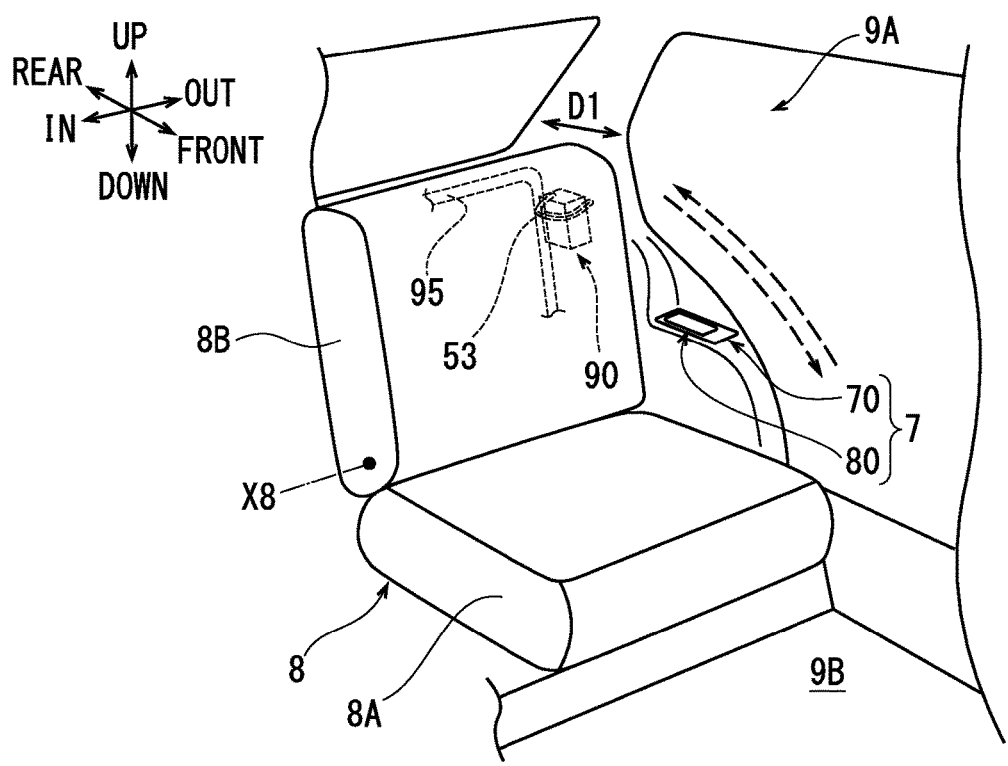
FIG. 1 is a schematic perspective view mainly showing a vehicle seat that utilizes a cable apparatus according to an exemplary embodiment of the present teachings.

As shown in FIG. 1, a vehicle seat 8 is provided as a rear seat in a vehicle interior (cabin) 9A of an automobile, which is an example of a vehicle according to the present teachings. The vehicle seat 8 includes a seat main body 8A, on which an occupant (passenger) sits, and a backrest 8B against which the occupant leans.

For purposes of reference, in FIG. 1, the front of the occupant sitting on the vehicle seat 8, i.e. the near side of the paper surface, is defined as the front direction of the vehicle. The rear of the occupant, i.e. the depth side of the paper surface, is defined as the rear direction of the vehicle. The right side of the occupant sitting on the vehicle seat 8, i.e. the left side of paper surface, is defined as the inner side of the vehicle. The left side of the occupant, i.e. the right side of the paper surface, is defined as the outer side of the vehicle. The front-rear direction, the vehicle inward-outward direction, and the up-down direction shown in FIG. 2 and subsequent figures are shown according to the directions in FIG. 1.

Figure 2:
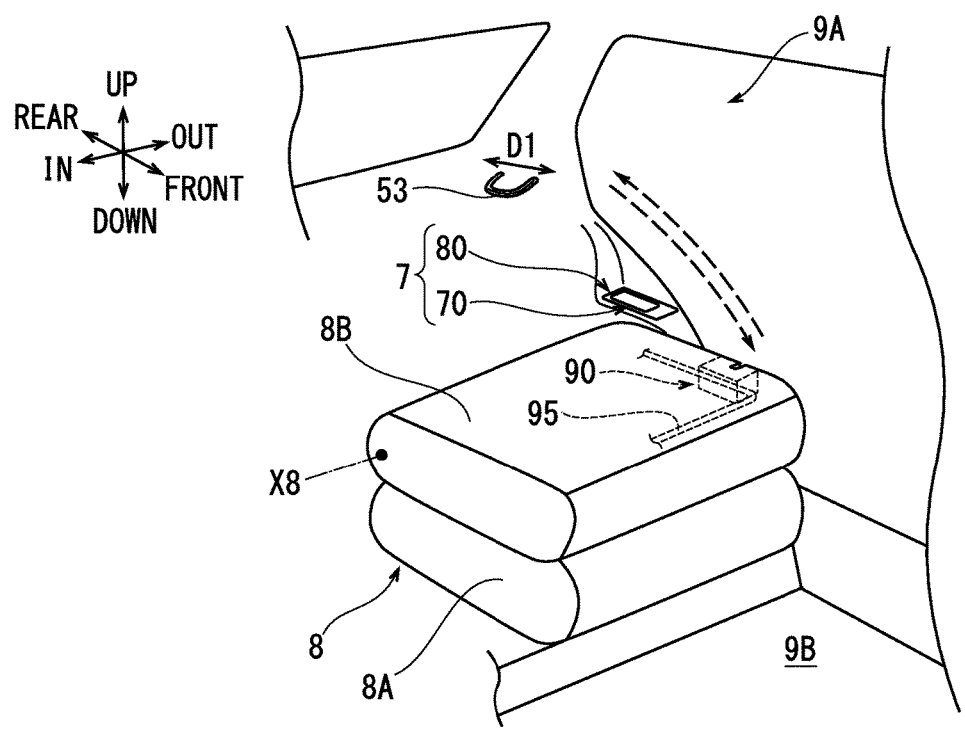
FIG. 2 is a schematic perspective view showing the vehicle seat of FIG. 1 in a folded-down position.
Figure 3:
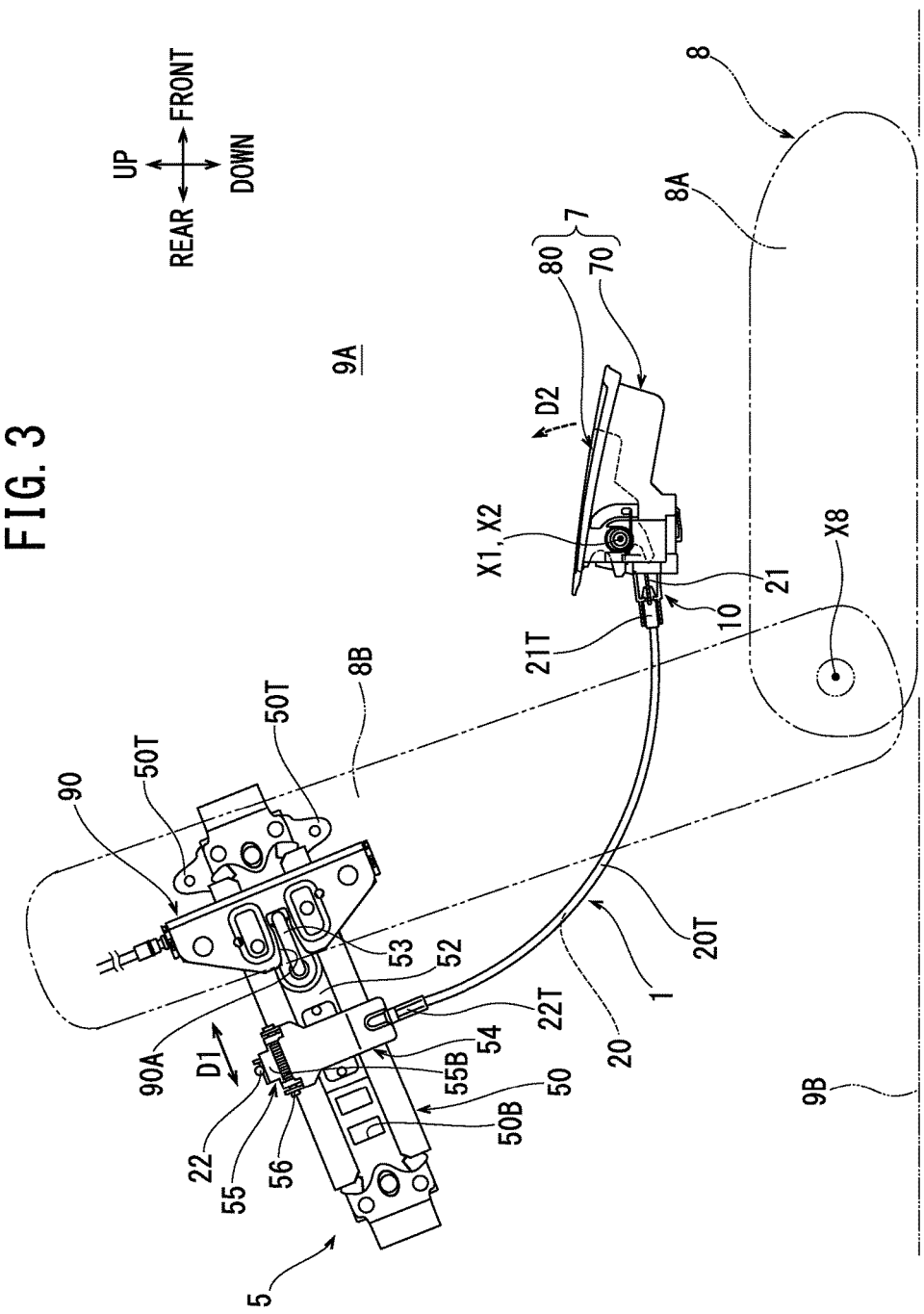
FIG. 3 is a schematic side view showing the vehicle seat and the cable apparatus according to the exemplary embodiment.

As shown in FIGS. 1 to 3, the seat main body 8A is fixed to the floor surface of a vehicle frame (vehicle body or chassis) 9B. The backrest 8B is supported by the seat main body 8A so as to be pivotable about a pivot axis X8 extending in the vehicle inward-outward direction and located at the rear end of the seat main body 8A.

A handle 7 is provided on an inner wall located on the vehicle outer side with respect to the vehicle seat 8 in the vehicle interior 9A. The handle 7 is provided for adjusting the tilt or incline (tilting posture) of the backrest 8B relative to the seat main body 8A. The handle 7 includes a handle housing and an operation lever (hand lever or seat reclining adjustment lever) 80. The handle housing 70 is fixed to the inner wall of the vehicle interior 9A at a position (location) where the occupant sitting on the vehicle seat 8 can operate the handle 7 with his/her left hand. The operation lever 80 is pivotably supported by the handle housing 70.

As shown in FIG. 3, a seat reclining apparatus 5 is mounted on (assembled onto) a part of the vehicle frame 9B located on the vehicle outer side with respect to the backrest 8B in its upright state. The seat reclining apparatus 5 is provided for changing the tilt or incline (tilting posture) of the backrest 8B while also fixing the backrest 8B to the vehicle frame 9B. In FIG. 3, the vehicle seat 8 is located on the paper surface near side with respect to the handle 7 and the seat reclining apparatus 5. Therefore, the vehicle seat 8 is indicated by a dashed line so as not to block the portions of the seat reclining apparatus 5 located behind it.

The handle 7 is a representative, non-limiting example of a "vehicle handle" according to the present teachings. The seat reclining apparatus 5 is a representative, non-limiting example of an "actuator" and a "vehicle seat reclining apparatus" according to the present teachings.

Referring now to FIGS. 3 to 11, an exemplary cable apparatus 1 according to the present teachings will now be described. The cable apparatus 1 is disposed between the handle 7 and the seat reclining apparatus 5. The cable apparatus 1 is designed to transmit movement (operation) of the operation lever 80 of the handle 7 to the seat reclining apparatus 5.

Figure 7:
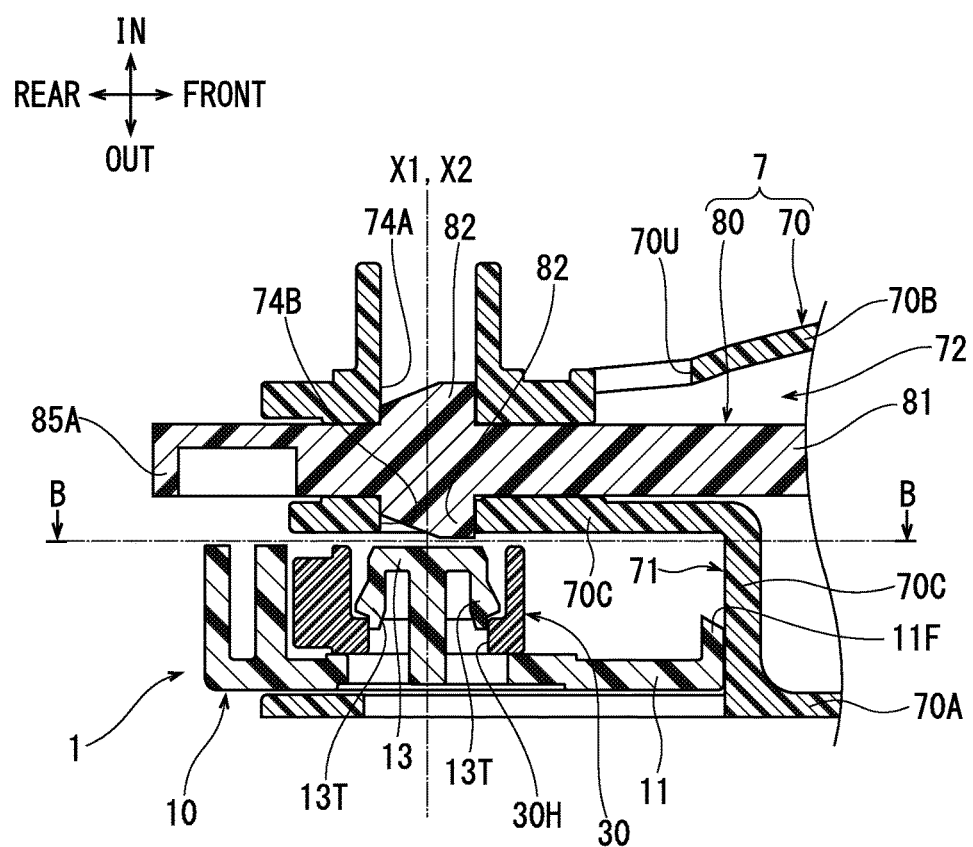
FIG. 7 is a partial cross-sectional view along line A-A shown in FIG. 6.
Figure 8:
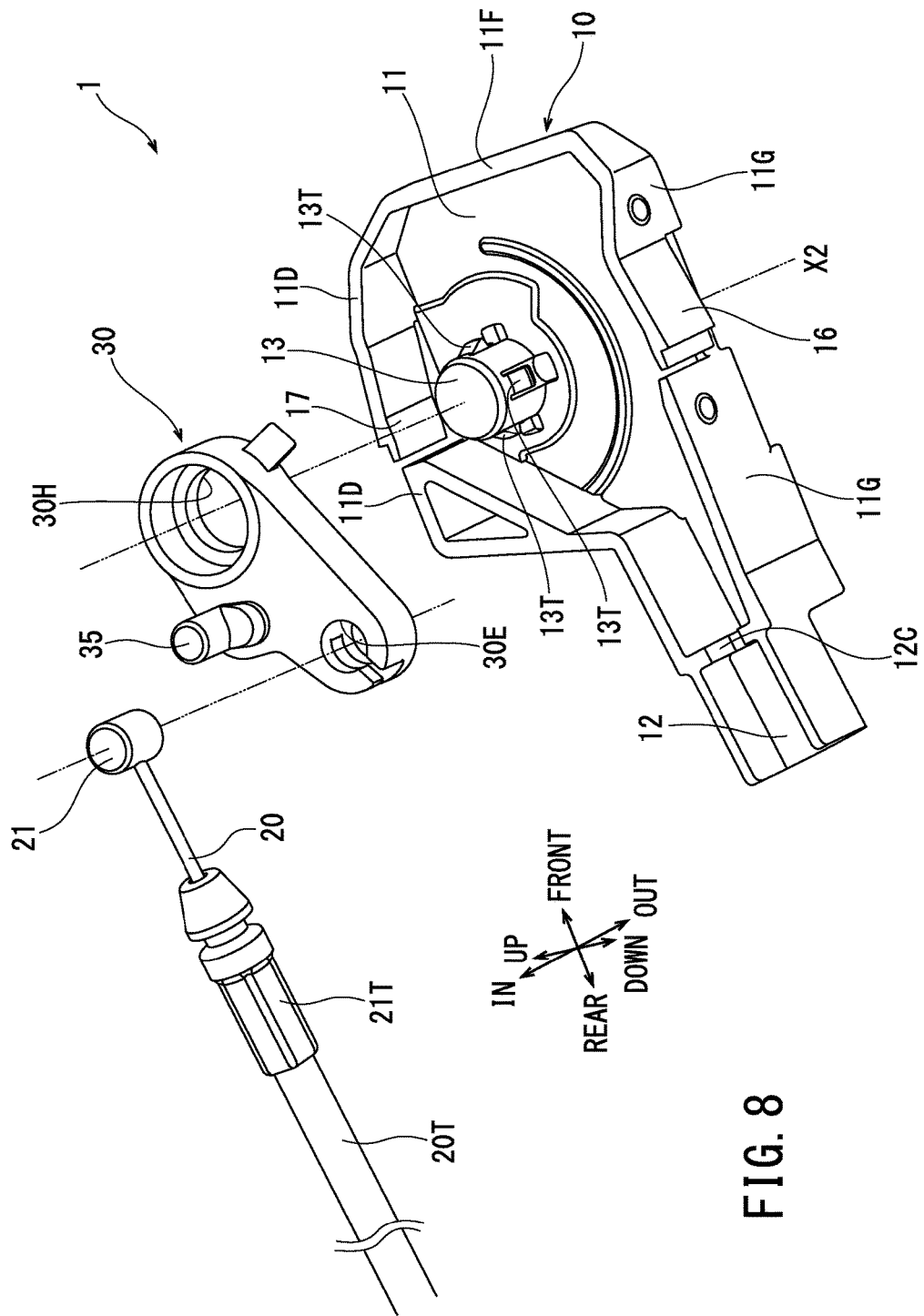
FIG. 8 is a perspective, exploded view of a case, a link lever, and a cable according to the exemplary embodiment.

Detailed configurations of the cable apparatus 1 and the handle 7 are explained in detail below. As shown, e.g., in FIGS. 7-11, the cable apparatus 1 includes a case 10, a cable 20, and a link lever 30. As shown in FIG. 7, the case 10 is housed in a housing chamber 71 defined by (formed in) the handle housing 70. As shown in FIG. 8, the cable 20 is inserted through an outer tube 20T. A first end 21 of the cable 20 is connected to the operation lever 80 via the link lever 30. The link lever 30 is pivotably supported by the case 10. When the operation lever 80 is pivoted in the direction of arrow D2 shown, e.g., in FIG. 4, the first end 21 of the cable 20 is displaced frontward and the cable 20 slides within the outer tube 20T. As a result, the second end 22 of the cable 20 shown in FIG. 5 is displaced downward.

As shown in FIGS. 1 and 2, a lock apparatus 90 is mounted on (assembled onto) a frame 95 within the backrest 8B. As shown in FIGS. 1 and 3, the lock apparatus 90 is disposed at the upper end portion in the backrest 8B in the upright state and the corner portion on the vehicle outer side. As shown in FIG. 3, the lock apparatus 90 has a well-known configuration including an entry opening 90A and a not-shown fork or the like capable of being displaced to close the entry opening 90A.

As shown in FIGS. 1 to 3 and 5, the seat reclining apparatus 5 includes a striker 53. The striker 53 is formed (configured) by bending a round metal bar into a substantial U-shape. The not-shown fork engages with (latches) the striker 53 of the seat reclining apparatus 5 in the entry opening 90A, whereby the lock apparatus 90 fixes the tilting posture of the backrest 8B.

Although not shown in the figures, a release lever is provided at the upper end portion of the backrest 8B. The release lever acts on the lock apparatus 90 to disengage the lock apparatus 90 and the striker 53. When the occupant operates the release lever to disengage the lock apparatus 90 and the striker 53, as shown in FIG. 2, the backrest 8B can be tilted frontward about the pivot axis X8.

As shown in FIGS. 3 and 5, the seat reclining apparatus 5 includes a rail 50, a slider 52, and a lock lever 55.

The rail 50 is formed (configured) by bending a steel plate into a substantial C-shape in cross-section. The rail 50 has a shape that linearly extends in a D1 direction (see FIG. 5). The D1 direction inclines downward while extending rearward. Attaching sections 50T are bent in a substantial crank shape and are attached to the rail 50. The rail 50 is fixed to the vehicle frame 9B by fastening the attaching sections 50T to the vehicle frame 9B using not-shown set screws. A plurality of latch holes 50B is arranged in the D1 direction so as to extend (penetrate) through the rail 50.

As shown in FIG. 3, a main body of the slider 52 is a metal plate having a substantially rectangular shape that is elongated in the D1 direction. The slider 52 is slidably housed in the rail 50. The striker 53 and a lever supporting member 54 are fixed to the slider 52. The slider 52 is guided by the rail 50 so as to be capable of sliding in the D1 direction integrally with the striker 53 and the lever supporting member 54.

As shown in FIGS. 3 and 5, the lock lever 55 is pivotably supported about a pivot shaft 56. The pivot shaft 56 is held at the upper end portion of the lever supporting member 54. The lock lever 55 includes an input section 55B that projects toward the vehicle outer side after extending upward from the pivot shaft 56. The lock lever 55 includes a latch claw 55A that projects toward the vehicle outer side after extending further downward than the pivot shaft 56 as shown in FIG. 5.

The lock lever 55 is biased by a not-shown torsion coil spring in a direction in which the latch claw 55A is caused to advance towards the vehicle outer side. Consequently, if the latch claw 55A faces (is aligned with) any one of the plurality of latch holes 50B of the rail 50, the latch claw 55A advances into the latch hole 50B, the latch claw 55A and the latch hole 50B engage with each other, and the slider 52 is prevented from sliding relative to the rail 50. Therefore, for example, if the latch claw 55A engages with the foremost latch hole 50B, the striker 53 is fixed to the vehicle frame 9B in (at) the foremost position. If the latch claw 55A engages with the rearmost latch hole 50B, the striker 53 is fixed to the vehicle frame 9B in (at) the rearmost position.

As shown in FIG. 5, the lower end portion of the lever supporting member 54 projects toward the vehicle outer side. An end portion 22T of the outer tube 20T is close to the second end 22 of the cable 20 and is locked (fixed) to the lower end portion of the lever supporting member 54. The second end 22 of the cable 20 is connected to the input section 55B of the lock lever 55.

Figure 4:
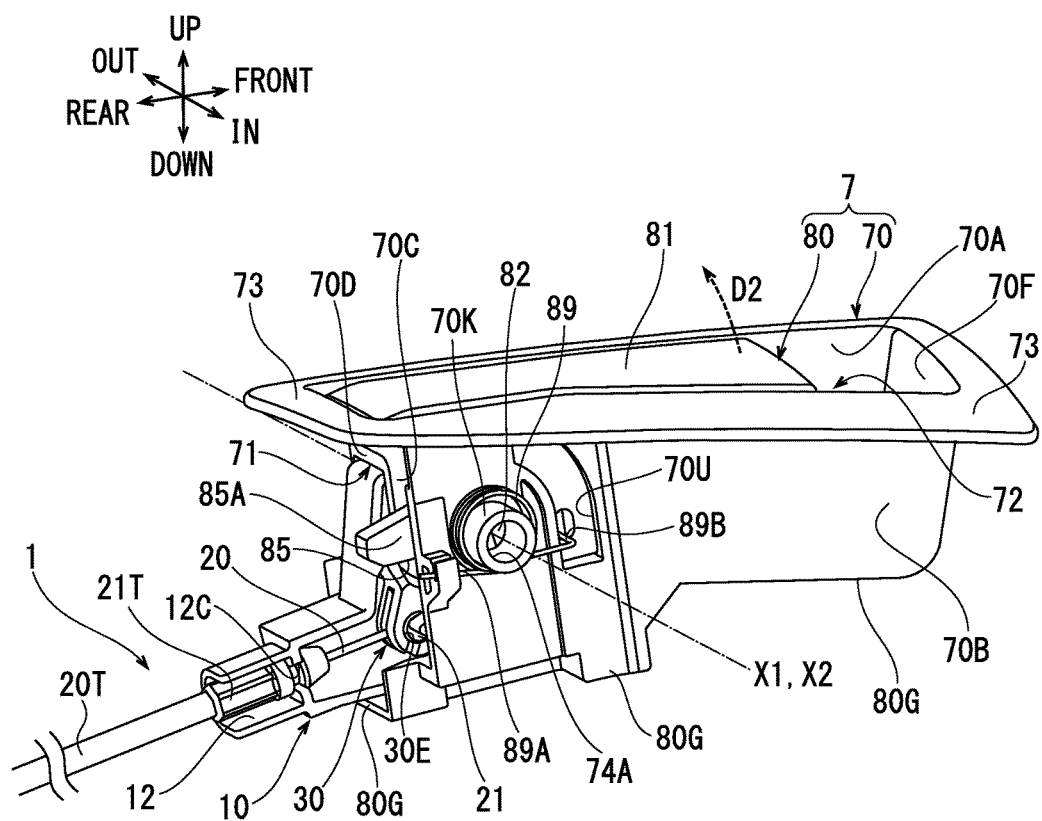
FIG. 4 is a perspective view showing the exemplary cable apparatus connected to a handle.
Figure 5:
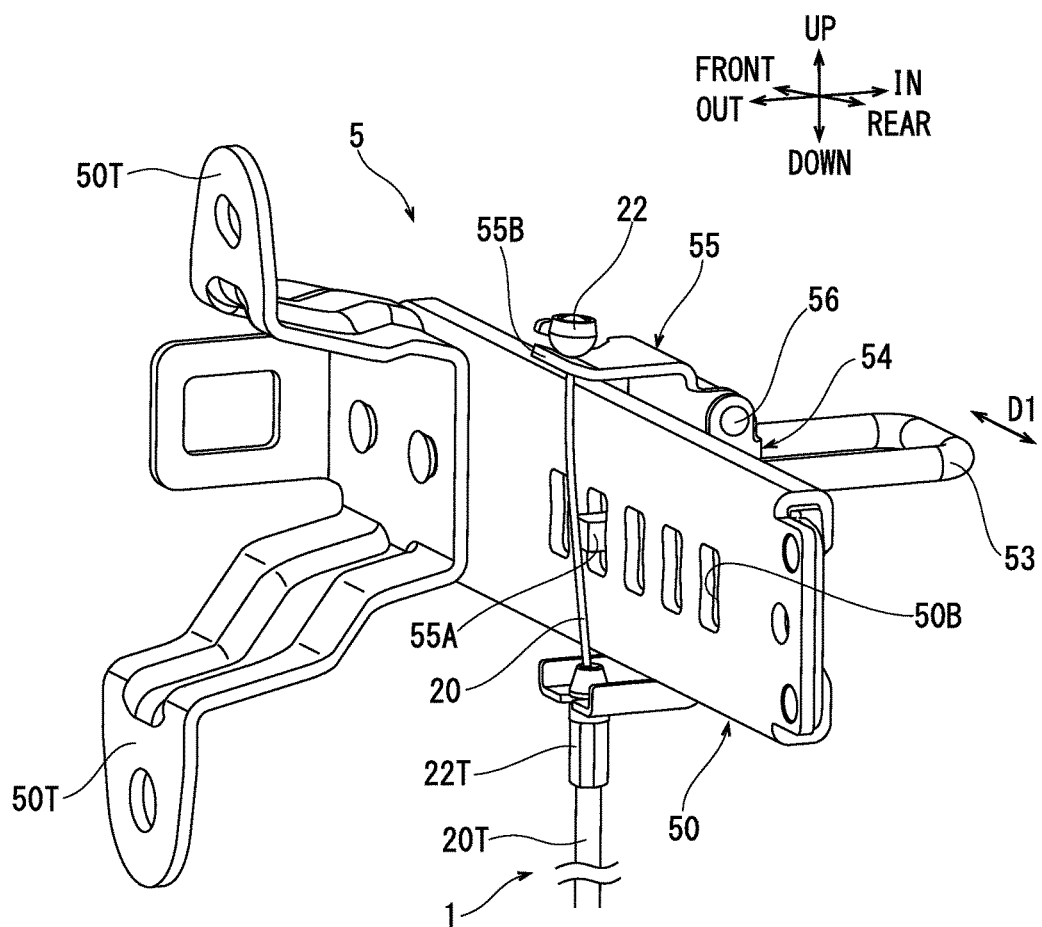
FIG. 5 is a perspective view showing the exemplary cable apparatus connected to a vehicle seat reclining apparatus.

In order to changing (adjust) the tilt or incline (tilting posture) of the backrest 8B relative to the seat main body 8A, the occupant operates (moves) the operation lever 80 of the handle 7 so as to pivot it in the direction D2 shown, e.g., in FIG. 4. As a result, the second end 22 of the cable 20 shown in FIG. 5 is displaced downward. Consequently, the lock lever 55 pivots, the latch claw 55A retracts towards the vehicle inner side, and the latch claw 55A separates from the latch hole 50B. Therefore, sliding of the slider 52 against (along) the rail 50 is possible again and the position of the striker 53 can be changed. The position of the striker 53 is displaced stepwise in the direction D1 shown in FIGS. 1 to 3 and 5. Consequently, the displacement is transmitted to the backrest 8B via the lock apparatus 90. The tilting posture of the backrest 8B changes stepwise.

Representative Configuration of the Handle

As shown in FIGS. 4, 6, 7 and FIGS. 9 to 11, the exemplary handle housing 70 of the handle 7 is a resin molded (cast) product. The handle housing 70 can be manufactured, for example, by injection molding a thermoplastic resin. In this embodiment, the operation lever 80 of the handle 7 is also a resin molded (cast) product. The operation lever 80 also can be manufactured, for example, by injection molding a thermoplastic resin. The operation lever 80 may also be referred to as a hand lever, a seat reclining adjustment lever, etc.

As shown in FIG. 4, the handle housing 70 includes a flange section 73 that is formed in a substantially rectangular annular shape elongated in the front-rear direction when viewed from above. The upper surface of the flange section 73 is a design surface exposed (visible) to the vehicle interior 9A.

As shown, e.g., in FIGS. 4, 6, 7 and 9, the handle housing 70 includes a front wall 70F, a bottom wall 80G, a first wall 70A, a second wall 70B, a third wall 70C, and a fourth wall 70D.

The front wall 70F is a substantially plate-shaped (planar) portion extending downward from a front portion on the inner circumferential edge of the flange section 73. The bottom wall 80G is a substantially plate-shaped (planar) portion connected to the lower end portion of the front wall 70F and extending rearward. The bottom wall 80G bends in a crank shape downward in the intermediate portion in the front-rear direction and further extends rearward. The rear end portion of the bottom wall 80G extends towards the right under a rear portion at the inner circumferential edge of the flange section 73.

Figure 6:
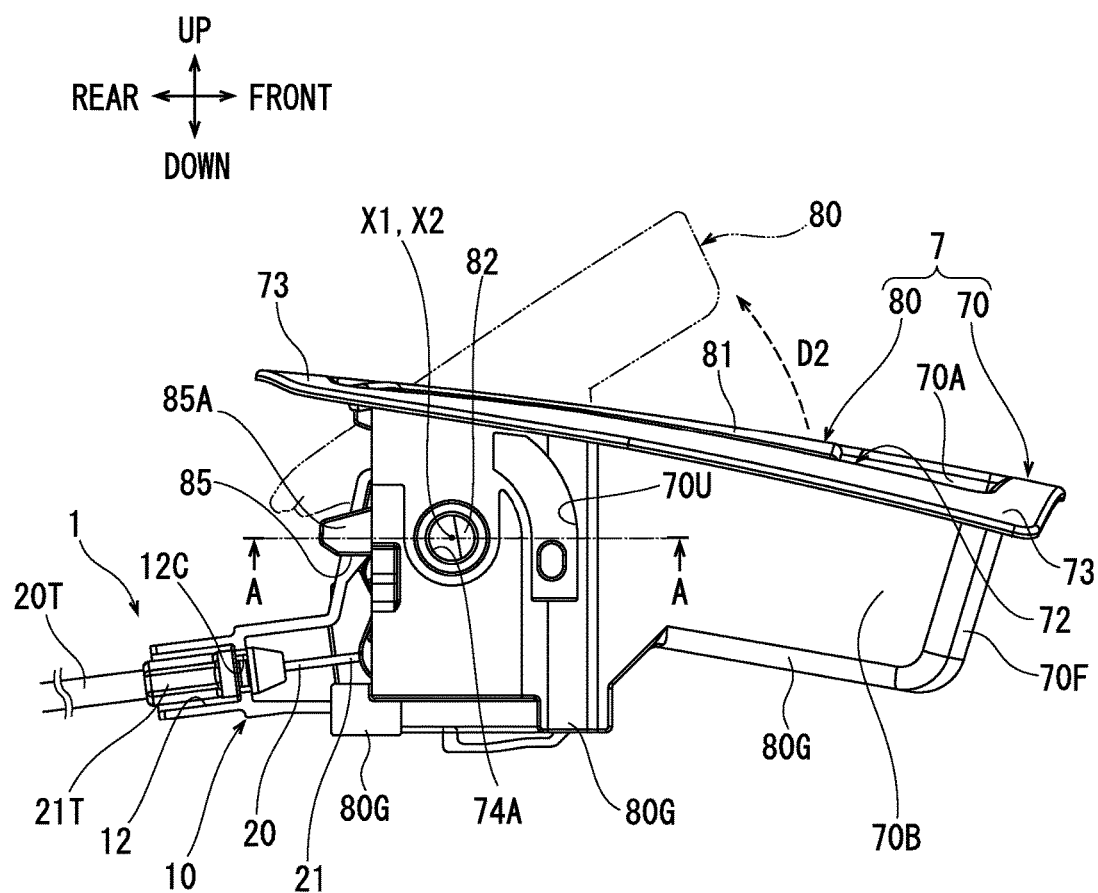
FIG. 6 is a side view showing the exemplary cable apparatus connected to the handle.

The first wall 70A is a substantially plate-shaped (planar) portion extending downward from a portion on the vehicle outer side on the inner circumferential edge of the flange section 73. The second wall 70B is a substantially plate-shaped (planar) portion extending downward from a portion on the vehicle inner side on the inner circumferential edge of the flange section 73. The front end portion of the first wall 70A and the front end portion of the second wall 70B are respectively connected to the front wall 70F. The lower end portion of the first wall 70A and the lower end portion of the second wall 70B are respectively connected to the bottom wall 80G. As shown in FIGS. 6 and 7, the rear end portion of the first wall 70A and the rear end portion of the second wall 70B extend towards the right under the rear portion at the inner circumferential edge of the flange section 73.

Figure 9:
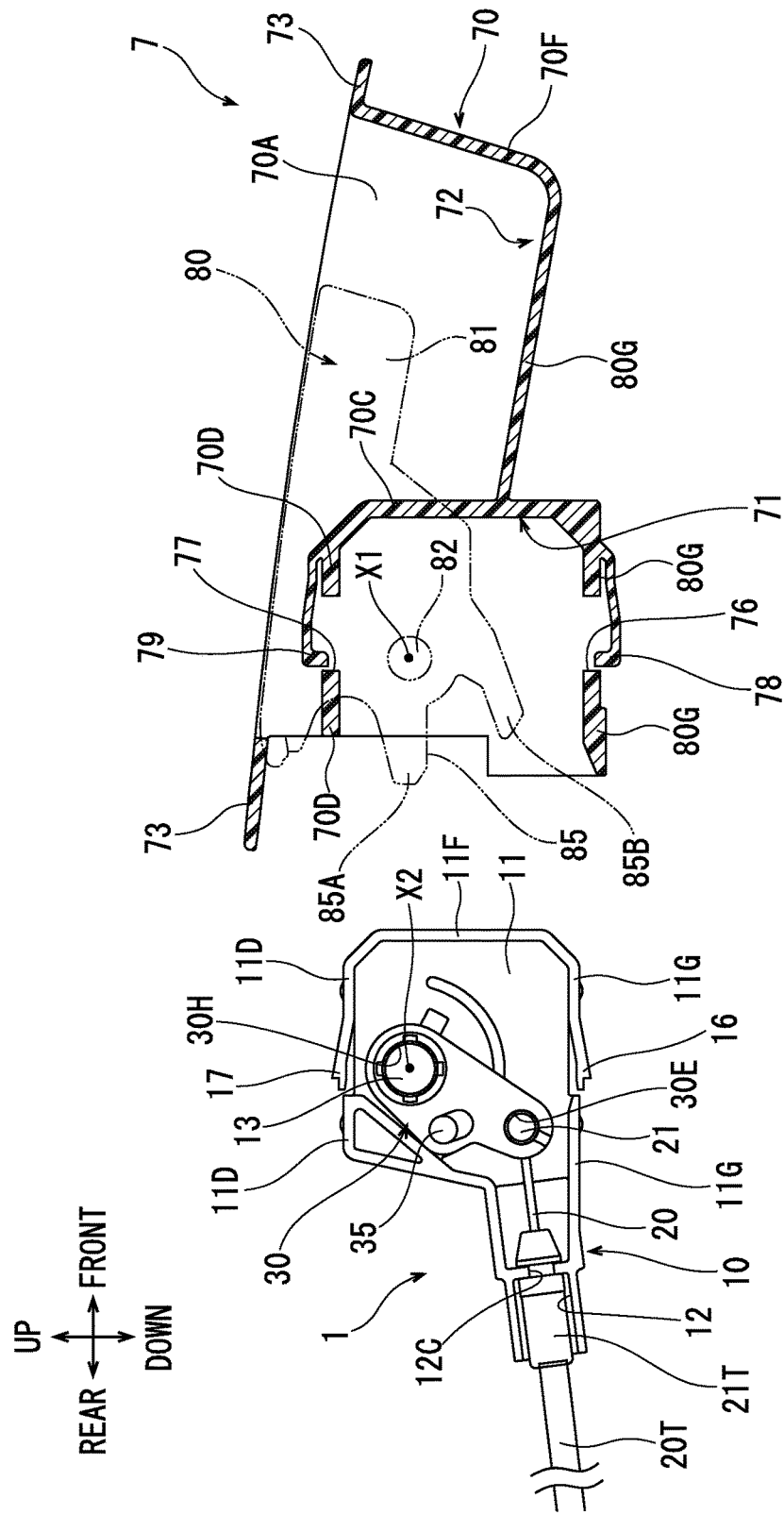
FIG. 9 is a view along line B-B shown in FIG. 7 and is a side view showing the cable apparatus before it is assembled (pushed) into a handle housing.
Figure 10:
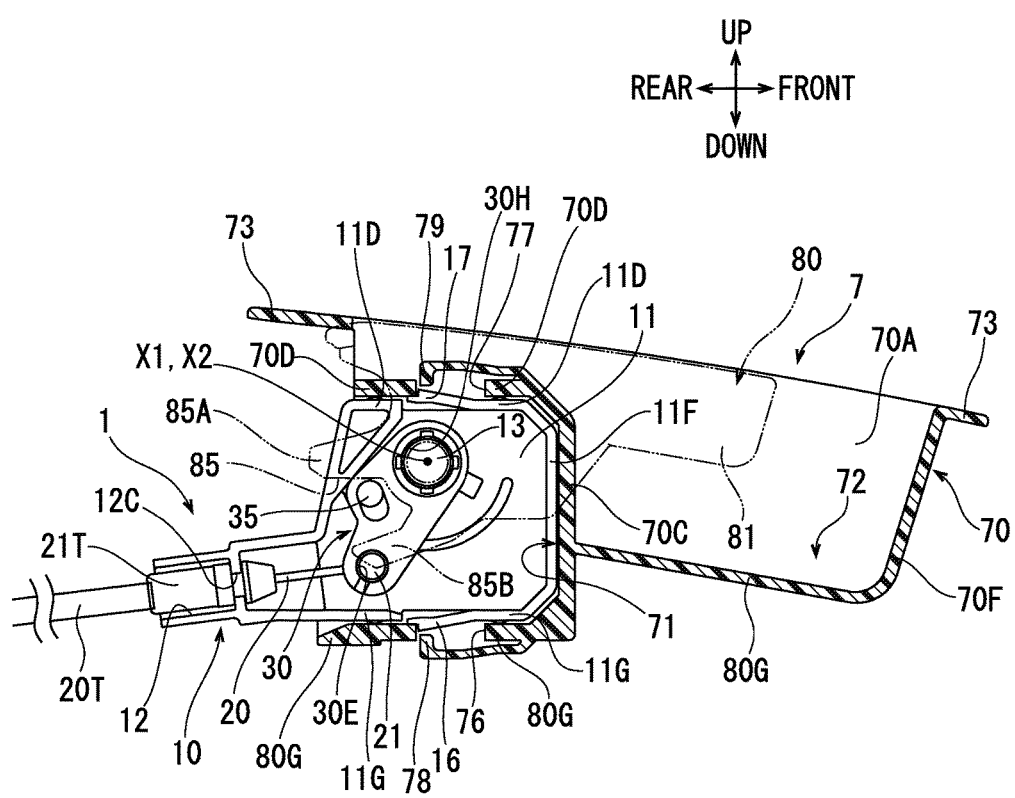
FIG. 10 is a side view of the cable apparatus of FIG. 9 after it has been assembled (pushed) into the handle housing.

As shown in FIG. 7, the third wall 70C bends after projecting towards the vehicle inner side from the intermediate portion in the front-rear direction in the first wall 70A and extends in a substantially plate-shaped (planar) shape rearward. The third wall 70C extends substantially in parallel to the first wall 70A and the second wall 70B. The rear end portion of the third wall 70C also extends towards the right under the rear portion at the inner circumferential edge of the flange section 73. In FIGS. 9 and 10, a portion extending rearward in a substantially plate-shaped (planar) shape in the third wall 70C is located on the paper surface near side. Therefore, this portion is not shown in the figures.

As shown, e.g., in FIG. 9, the fourth wall 70D projects toward the vehicle inner side from a rearward and upward portion in the first wall 70A and extends in the front-rear direction. The front end portion of the fourth wall 70D is connected to a portion at the front end and the upper end of the third wall 70C.

As shown, e.g., in FIGS. 4, 7 and 9, an operation-lever housing section 72 and the housing chamber 71 are formed in the handle housing 70.

The operation-lever housing section 72 is defined (partitioned) by the front wall 70F, a front portion of the bottom wall 80G, the first wall 70A, a front portion of the second wall 70B, the third wall 70C, and the fourth wall 70D. The operation-lever housing section 72 is open upward and rearward.

The housing chamber 71 is defined (partitioned) by a rear portion of the bottom wall 80G, a rear portion of the first wall 70A, the third wall 70C, and the fourth wall 70D. The housing chamber 71 is open rearward.

As shown in FIGS. 4 to 7, a support hole 74A penetrates through a rear portion of the second wall 70B in the vehicle inward-outward direction. As shown in FIG. 7, a support hole 74B penetrates through the third wall 70C in the vehicle inward-outward direction. The support holes 74A and 74B define a first axis X1.

As shown in FIG. 9, an engaging section 76 and a disengaging operation section (disengaging cantilever structure) 78 are formed in the rear portion of the bottom wall 80G. The engaging section 76 is a hole that penetrates through the rear portion of the bottom wall 80G in the up-down direction. The disengaging operation section 78 extends rearward in a cantilever shape after branching downward from a portion of the bottom wall 80G farther frontward than the engaging section 76. The rear end portion of the disengaging operation section 78 bends upward and enters a rear portion of the engaging section 76.

An engaging section 77 and a disengaging operation section 79 are formed on the fourth wall 70D. The engaging section 77 and the disengaging operation section 79 respectively form pairs with the engaging section 76 and the disengaging operation section 78. The engaging section 77 is a hole that penetrates through the fourth wall 70D in the up-down direction. The disengaging operation section 79 extends rearward in a cantilever shape after branching upward from a portion of the fourth wall 70D farther frontward than the engaging section 77. The rear end portion of the disengaging operation section 79 bends downward and enters a rear portion of the engaging section 77.

As shown, e.g., in FIGS. 4, 7 and 9, the operation lever 80 includes a lever main body 81, a shaft section (shaft) 82, and a connecting section (abutment structure) 85.

The lever main body 81 is housed in the operation-lever housing section 72. As shown in FIG. 9, a rear portion of the lever main body 81 bulges (protrudes) downward. As shown in FIG. 7, the rear portion of the lever main body 81 is sandwiched by the rear portion of the second wall 70B and the third wall 70C in the vehicle inward-outward direction.

The shaft section 82 projects in a columnar shaft shape from the rear portion of the lever main body 81 toward the vehicle outer side and towards the vehicle inner side and is inserted into the support holes 74A and 74B. Consequently, the operation lever 80 is pivotably supported by the handle housing 70 about the first axis X1.

As shown in FIG. 4, a cylindrical section 70K having the first axis X1 as its axis protrudes from a surface of the second wall 70B that faces the vehicle inner side. A torsion coil spring 89 is attached to the cylindrical section 70K. A first end portion 89A of the torsion coil spring 89 is latched (affixed) to the rear end portion of the second wall 70B. A second end portion 89B of the torsion coil spring 89 enters the operation-lever housing section 72 via an opening 70U formed in the second wall 70B and is latched (affixed) to the lever main body 81. The torsion coil spring 89 biases the operation lever 80 so as to retract in a direction opposite to the direction D2 shown, e.g., in FIG. 4, i.e. so as to retract into the operation-lever housing section 72.

As shown, e.g., in FIGS. 4, 7 and 9, a first projecting section 85A and a second projecting section 85B are formed in the rear portion of the lever main body 81. The first projecting section 85A projects rearward from a position farther rearward than the shaft section 82. The second projecting section 85B inclines downward and projects rearward from a position further downward than the shaft section 82. The connecting section 85 is a recessed section formed between the first projecting section 85A and the second projecting section 85B.

Representative Configuration of the Exemplary Cable Apparatus

As shown in FIG. 8, the case 10 of the exemplary cable apparatus 1 is a resin molded (cast) product and is manufactured, for example, by injection molding a thermoplastic resin. Similarly, the link lever 30 of the exemplary cable apparatus 1 is also a resin molded product and is manufactured, for example, by injection molding a thermoplastic resin. It should be noted that, in the following explanation, the front-rear direction, the up-down direction, and the vehicle inward-outward direction, as shown in FIG. 10 and elsewhere, refer to the state in which the case 10 housed in the housing chamber 71 of the handle housing 70 is set as the reference.

As shown in FIG. 8, the cable 20 of the exemplary cable apparatus 1 is a steel wire rope formed (configured) by twisting or braiding (twining) a plurality of steel wires. The cable 20 is slidably inserted through the outer tube 20T, which is flexible. The first end 21 of the cable 20 is formed by crimping (caulking) an end member made of aluminum onto the distal end of the steel wire rope. A first end portion 21T of the outer tube 20T is close to the first end 21 of the cable 20 and is constituted by a head section and a fastening section in a well-known manner. The fastening section of the first end portion 21T has a substantially cylindrical shape that can be brought close to and moved away from the head section by a thread groove. As shown in FIG. 5, the second end 22 of the cable 20 is also formed by crimping (caulking) an end member made of aluminum onto the distal end of the steel wire rope. The end portion 22T of the outer tube 20T is close to the second end 22 of the cable 20 and is also constituted by a head section and a fastening section in the well-known manner. The fastening section of the end portion 22T has also a substantially cylindrical shape that can be brought close to and moved away from the head section by a thread groove.

As shown, e.g., in FIGS. 8 and 9, the case 10 includes a base section 11, a support shaft 13, a front wall 11F, a first wall 11G, a second wall 11D, and an outer-tube holding section 12.

The base section 11 extends in a substantially flat shape in the front-back direction and the up-down direction. The base section 11 is formed in a substantially rectangular shape when viewed in the vehicle inward-outward direction.

The support shaft 13 is a columnar shaft projecting from an upward portion of the base section 11 toward the vehicle inner side. The support shaft 13 defines a second axis X2 extending in the vehicle inward-outward direction. A plurality of locking claws 13T is formed on the outer circumferential surface of the support shaft 13 so as to be elastically deformable in a radially inward direction.

The front wall 11F projects (perpendicularly) from the front end of the base section 11 toward the vehicle inner side and extends in the up-down direction. The first wall 11G projects (perpendicularly) from the lower end of the base section 11 toward the vehicle inner side and extends in the front-back direction. The second wall 11D projects (perpendicularly) from the upper end of the base section 11 toward the vehicle inner side and extends in the front-back direction.

An engaged section (engaging cantilever tab) 16 is formed on the first wall 11G in a cantilever shape by partially cutting off an intermediate portion in the front-rear direction in the first wall 11G. The engaged section 16 is inclined downward and toward the rear. The rear end of the engaged section 16 is recessed in a step shape.

An engaged section (engaging cantilever tab) 17 is formed on the second wall 11D and forms a pair with the engaged section 16. The engaged section 17 is formed in a cantilever shape by partially cutting off an intermediate portion in the front-rear direction in the second wall 11D. The engaged section 17 is inclined upward and toward the rear. The rear end of the engaged section 17 is recessed in a step shape.

The outer-tube holding section 12 projects rearward from a corner portion at the rear, lower end of the base section 11. The outer-tube holding section 12 has a substantial C-shape in cross-section. An engaging recessed section 12C is cut out of a partition wall that is formed halfway in the outer-tube holding section 12. The first end portion 21T of the outer tube 20T is held by the outer-tube holding section 12 by sandwiching the circumference of the locking recessed section 12C between the head section and the fastening section. As a result, the first end 21 of the cable 20 is disposed in the case 10.

A through-hole 30H is formed through a first end portion of the link lever 30, an end holding section 30E is formed in a second end portion of the link lever 30, and a connected section (pin) 35 is formed in the intermediate portion of the link lever 30. The connected section 35 has a columnar shape and projects toward the vehicle inner side. The support shaft 13 of the case 10 is inserted through the through-hole 30H until the locking claws 13T engage with (contact) the inner circumferential edge of the through-hole 30H, whereby the link lever 30 is supported by the case 10 to be pivotable about the second axis X2. The end holding section 30E of the link lever is located farther frontward than the outer-tube holding section 12 and is connected to the first end 21 of the cable 20 in the case 10.

The cable apparatus 1 having the configuration explained above is manufactured as a unit having the case 10, the link lever 30, the cable 20, and the outer tube 20T assembled together. The cable apparatus 1 is then assembled together with the vehicle seat 8, the handle 7, and the seat reclining apparatus 5 in the vehicle assembly line.

During the assembly, as shown in FIG. 9, the case of the cable apparatus 1 is displaced frontward from a position farther rearward than the handle housing 70 and is inserted into the housing chamber 71 as shown in FIG. 10. Then, the first wall 11G is guided toward the rear portion of the bottom wall 80G and the second wall 11D is guided toward the fourth wall 70D. The case 10 enters the housing chamber 71. At this time, the engaged sections 16 and 17 are elastically deformed (inwardly). When the case 10 reaches a position where the front wall 11F stops against a portion of the third wall 70C projecting from the first wall 70A towards the vehicle inner side, the engaged sections 16 and 17 engage with the engaging sections 76 and 77 with a restoring force. The case 10 is thereby fixed so that it is not removable from the housing chamber 71.

In this way, the case 10 is held by the handle housing 70 with the case 10 housed (held, retained) in the housing chamber 71. At this time, the connected section (pin) 35 enters the connecting section (abutment structure) 85, which has a recessed structure. The connected section 35 contacts or abuts (is connected to) the connecting section 85. As shown in, e.g., FIGS. 7 and 10, the first axis X1 and the second axis X2 are coaxially disposed at this time.

Figure 11:
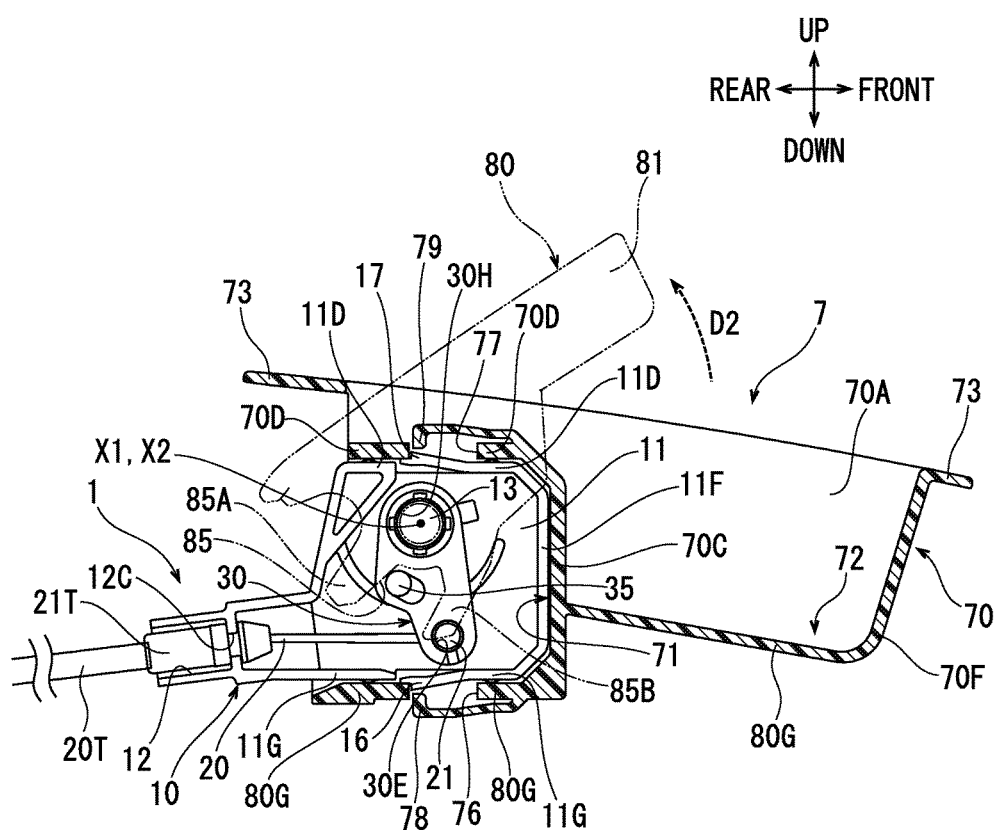
FIG. 11 is a view along line B-B shown in FIG. 7 and is a side view showing pivoting of an operation lever, a link lever, a boss, etc.

As shown in FIG. 10, the connected section 35 is located in a position adjacent to the lower end edge of the first projecting section (first projection) 85A when the connected section 35 contacts (is connected to) the connecting section 85. Therefore, as shown in FIG. 11, when the occupant pivots the operation lever 80, the connected section 35 is pushed downward by the first projecting section 85A and is displaced downward and frontward about the second axis X2. Therefore, the link lever 30 pivots about the second axis X2. The end holding section 30E is displaced frontward and pulls the first end 21 of the cable 20. As a result, as explained above, it is possible to change the position of the striker 53 in the seat reclining apparatus 5.

As shown in FIG. 10, when the disengaging operation section 78 is pushed upward while the engaging section 76 and the engaged section 16 are engaged, the rear end portion of the disengaging operation section 78 pushes up the engaged section 16 and separates (pushes away) the engaged section 16 from the engaging section 76. When the disengaging operation section 79 is pushed downward while the engaging section 77 and the engaged section 17 are engaged, the rear end portion of the disengaging operation section 79 pushes down the engaged section 17 and separates (pushes away) the engaged section 17 from the engaging section 77. When the disengaging operation sections 78 and 79 disengage the engaging sections 76 and 77 from the engaged sections 16 and 17 in this way, the case 10 can be easily pulled out of (removed from) the housing chamber 71. At this time, the connected section 35 only separates rearward from the recessed connecting section 85 and does not hinder the removal or extraction (pulling-out) of the case 10.

Functions and Effects

The cable apparatus 1 of the above-described exemplary embodiment utilizes a relatively simple configuration in which, as shown, e.g., in FIG. 3, the cable 20 is not divided into the first cable and the second cable (unlike the above-described known cable apparatus). Furthermore, the exemplary cable apparatus 1 does not include the first and second coupling cases and the first and second coupling pieces of the above-described known cable apparatus.

In addition, in the exemplary cable apparatus 1, the link lever 30 is supported by the case 10 so as to be pivotable about the second axis X2, as shown, e.g., in FIGS. 8 and 9. The first end 21 of the cable 20 is connected to the end holding section 30E of the link lever 30. Therefore, as shown, e.g., in FIGS. 4 and 10, simply by inserting the case 10 into the housing chamber 71 of the handle housing 70, it is possible to easily carry out the manual work necessary to attach the cable apparatus 1 to the handle 7. Then, it is possible to operate the seat reclining apparatus 5 with the operation lever 80.

Therefore, in the exemplary cable apparatus 1, it is possible to achieve a reduction in manufacturing costs and a simplification of the assembly work. That is, with the functions and effects achieved by the exemplary cable apparatus 1, it is possible to achieve a simplification of the assembly work and a reduction in manufacturing costs during the manufacturing process, in which the handle 7 is assembled with the seat reclining apparatus 5 in the interior (cabin) 9A of the vehicle.

In the exemplary cable apparatus 1, as shown in FIG. 10, the connected section 35 of the link lever 30 is simultaneously connected to (abuts) the connecting section 85 of the operation lever 80 while the case 10 is being pushed into the housing chamber 71. The link lever 30 can be displaced by the pivoting of the operation lever 80. As a result, it is unnecessary to separately connect (manually connect) the link lever 30 to the operation lever 80 using a connecting means such as connection pins. Therefore, it is possible to further simplify the assembly work.

Further, in the exemplary cable apparatus 1, as shown in FIG. 10, the engaged sections 16 and 17 of the case 10 simultaneously engage with the corresponding engaging sections 76 and 77 of the handle housing 70 and fix the case 10 to (in) the housing chamber 71 while the case 10 is being pushed into the housing chamber 71. As a result, it is unnecessary to separately fix the case 10 to the housing chamber 71 using a fastening means such as a screw. Therefore, it is possible to further simplify the assembly work.

In the exemplary cable apparatus 1, as shown in FIG. 10, the engaging sections 76 and 77 respectively disengage from the engaged sections 16 and 17 by pushing up the engaged section 16 with the disengaging operation section 78 and by pushing down the engaged section 17 with the disengaging operation section 79 while the case 10 is housed in the housing chamber 71. Consequently, in the exemplary cable apparatus 1, it is possible to easily remove the case 10 from the housing chamber 71 of the handle housing 70. As a result, it is possible to easily carry out maintenance, repairs, etc. on the handle 7 and the cable apparatus 1.

Further, in the exemplary cable apparatus 1, as shown in FIG. 7, since the case 10 is housed in the housing chamber 71, the first axis X1 and the second axis X2 are coaxially disposed. Therefore, in the exemplary cable apparatus 1, the operation lever 80 and the link lever 30 are disposed closer to each other as compared to an arrangement in which the first axis X1 and the second axis X2 are eccentrically disposed. As a result, it is possible to reduce the size of the handle housing 70.

Although the present invention has been explained above in accordance with an exemplary embodiment, it is important to note that the invention is not limited to the above-described embodiment. It may be appropriately modified to adapt to specific applications of the present teachings without departing from the spirit and/or scope of the present invention.

For example, the position and the posture of the disposition (orientation) of the handle are not limited to arrangement shown in the exemplary embodiment and can be changed as appropriate. For example, the handle 7 may be disposed in a manner that is rotated downward by approximately 60° to 80° around the first axis X1 such that the front end of the handle housing 70 shown, e.g., in FIG. 4 faces downward. In this case, the occupant operates the distal end portion, which projects below the operation lever 80, to pull the distal end portion frontward.

A configuration in which there are two or more cable apparatuses and the cable apparatuses can be operated by one handle is also encompassed by the present invention.

In the exemplary embodiment, the disengaging operation section is provided in the handle housing. However, the present invention is not limited to this configuration. For example, it is also possible to provide the disengaging operation section in the case or provide the disengaging operation section in the handle housing and in the case.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A cable apparatus configured to be disposed between a handle and an actuator so as to transmit movement of the handle to the actuator,
    the handle including a handle housing defining a housing chamber and an operation lever supported by the handle housing so as to be pivotable about a first axis,
    the cable apparatus comprising:
    a case configured to be housed in the housing chamber;
    a cable having a first end disposed within the case and a second end configured to be connected to the actuator; and
    a link lever supported by the case so as to be pivotable about a second axis, the link lever being connected to the first end of the cable within the case, and being displaceable by pivoting the operation lever.

2. The cable apparatus according to claim 1, wherein the link lever further comprises:
    a connected section configured to contact a connecting section of the operation lever when the case is housed in the housing chamber.

3. The cable apparatus according to claim 2, wherein the case further comprises:
    an engaged section configured to engage with an engaging section of the handle housing when the case is housed in the housing chamber.

4. The cable apparatus according to claim 1, wherein the case further comprises:
    an engaged section configured to engage with an engaging section of the handle housing when the case is housed in the housing chamber.

5. The cable apparatus according to claim 4, further comprising:
    a disengaging operation section configured to disengage the engaging section from the engaged section, the disengaging operation section being provided in the handle housing and/or in the case.

6. The cable apparatus according to claim 3, further comprising:
    a disengaging operation section configured to disengage the engaging section from the engaged section, the disengaging operation section being provided in the handle housing and/or in the case.

7. The cable apparatus according to claim 1, wherein the first axis is coaxial with the second axis when the case is housed in the housing chamber.

8. The cable apparatus according to claim 1, wherein:
    the handle is a vehicle handle provided in a vehicle interior and configured to adjust a tilting posture of a backrest of a vehicle seat, and
    the actuator is a vehicle seat reclining apparatus provided in a vehicle body and configured to change the tilting posture while fixing the backrest to the vehicle body.

9. A cable apparatus configured to be disposed between a handle and an actuator so as to transmit movement of the handle to the actuator,
    the handle including a handle housing defining a housing chamber and an operation lever supported by the handle housing so as to be pivotable about a first axis,
    the cable apparatus comprising:
    a case configured to be housed in the housing chamber;
    a cable having a first end disposed within the case and a second end configured to be connected to the actuator; and
    a link lever supported by the case so as to be pivotable about a second axis, the link lever being connected to the first end of the cable within the case, and being displaceable by pivoting the operation lever, wherein:
    a connected section is provided on the link lever and is configured to contact a connecting section of the operation lever when the case is housed in the housing chamber,
    an engaged section is provided on the case and is configured to engage with an engaging section of the handle housing when the case is housed in the housing chamber,
    the first axis is coaxial with the second axis when the case is housed in the housing chamber,
    the handle is a vehicle handle provided in a vehicle interior and configured to adjust a tilting posture of a backrest of a vehicle seat, and
    the actuator is a vehicle seat reclining apparatus provided in a vehicle body and configured to change the tilting posture while fixing the backrest to the vehicle body.

10. A vehicle comprising the cable apparatus according to claim 9 and further comprising:
    the handle including the handle housing defining the housing chamber, the handle being provided in the vehicle interior and configured to adjust the tilting posture of the backrest of the vehicle seat, and the case being housed in the housing chamber,
    the operation lever supported by the handle housing so as to be pivotable about the first axis,
    the actuator including the vehicle seat reclining apparatus provided in the vehicle body and configured to change the tilting posture while fixing the backrest to the vehicle body, the second end of the cable being connected to the actuator,
    the connecting section provided in the operation lever and contacting the link lever,
    the engaging section provided in the handle housing and engaging the engaged section, and a disengaging operation section configured to disengage the engaging section from the engaged section, the disengaging operation section being provided in the handle housing, wherein the first axis is coaxial with the second axis.

11. A cable apparatus comprising:

a case, a link lever pivotably supported on the case so as to be pivotable about a second axis, the link lever having an end portion displaced from the second axis, and a cable having a first end disposed within the case and a second end disposed outside of the case, wherein the first end of the cable is connected to the end portion of the link lever.

12. The cable apparatus of claim 11, wherein at least one wall of the case includes a cantilevered engaging tab configured to be displaceable when the case is being inserted into a housing chamber of a handle and to then engage with a corresponding engaging structure on the handle housing to fix the case within the handle housing.

13. The cable apparatus of claim 12, wherein the link lever includes a connecting pin that extends in parallel with the second axis, the connecting pin configured to contact and be moved by a projection of an operation lever of the handle.

14. A vehicle comprising the cable apparatus of claim 13 and further comprising:

a handle having an operation lever pivotably supported on a handle housing so as to pivot about a first axis, the case being disposed within the handle housing and a projection of the operation lever being in contact with the connecting pin of the link lever, a cantilevered disengaging tab defined on the handle housing adjacent to the cantilevered engaging tab on the case and being inwardly displaceable to disengage the cantilevered engaging tab from the corresponding engaging structure on the handle housing, and an actuator operatively coupled to a vehicle seat reclining apparatus connected to a vehicle seat, the actuator being operatively connected to the second end of the cable, wherein the first axis is coaxial with the second axis.

* * * * *